United States Patent
Untermyer

[15] 3,707,631
[45] Dec. 26, 1972

[54] NUCLEAR FUEL ASSAY SYSTEM

[72] Inventor: Samuel Untermyer, Portola Valley, Calif.

[73] Assignee: National Nuclear Corporation, Palo Alto, Calif.

[22] Filed: April 2, 1970

[21] Appl. No.: 25,157

[52] U.S. Cl..............................250/71.5 R, 250/83.1
[51] Int. Cl................................G01t 1/20, G01t 3/00
[58] Field of Search........................250/71.5 R, 83.1

[56] References Cited

UNITED STATES PATENTS

| | | | |
|---|---|---|---|
| 3,018,374 | 1/1962 | Pritchett | 250/71.5 R |
| 3,222,521 | 12/1965 | Einfeld | 250/83.1 |
| 2,900,516 | 8/1959 | Davis et al. | 250/71.5 R |
| 2,961,541 | 11/1960 | Ruderman | 250/71.5 R |

*Primary Examiner*—Archie R. Borchelt
*Attorney*—Flehr, Hohbach, Test, Albritton & Herbert

[57] ABSTRACT

A system for the non-destructive assay of nuclear fuel is disclosed. A scintillating body is positioned near the fissionable fuel species to be assayed. An interrogating beam of low energy neutrons is passed through a moderating material to reduce the neutrons to the thermal or low epi-thermal regions. The moderated interrogating beam penetrates a selected segment of the fuel. Fission of the fissionable species radiates fast neutrons into the scintillating body producing proton recoil in hydrogenous material. These protons produce scintillation events in large sized phosphor grains. Photons from the scintillation events are carried through a transparent light guide to a light detector for counting. The light guide is disclosed as a substantially transparent, non-scintillating polymer surrounded by a light reflecting layer which in turn is covered by a light shield. In a modified form the nuclear fuel to be assayed is positioned in a cavity enclosed by a moderating material with a neutron source and scintillating body radially positioned from the cavity. The scintillating material is arrayed in a series of grooves formed in a transparent light guide connected with a counting device.

17 Claims, 6 Drawing Figures

PATENTED DEC 26 1972 3,707,631
SHEET 1 OF 2
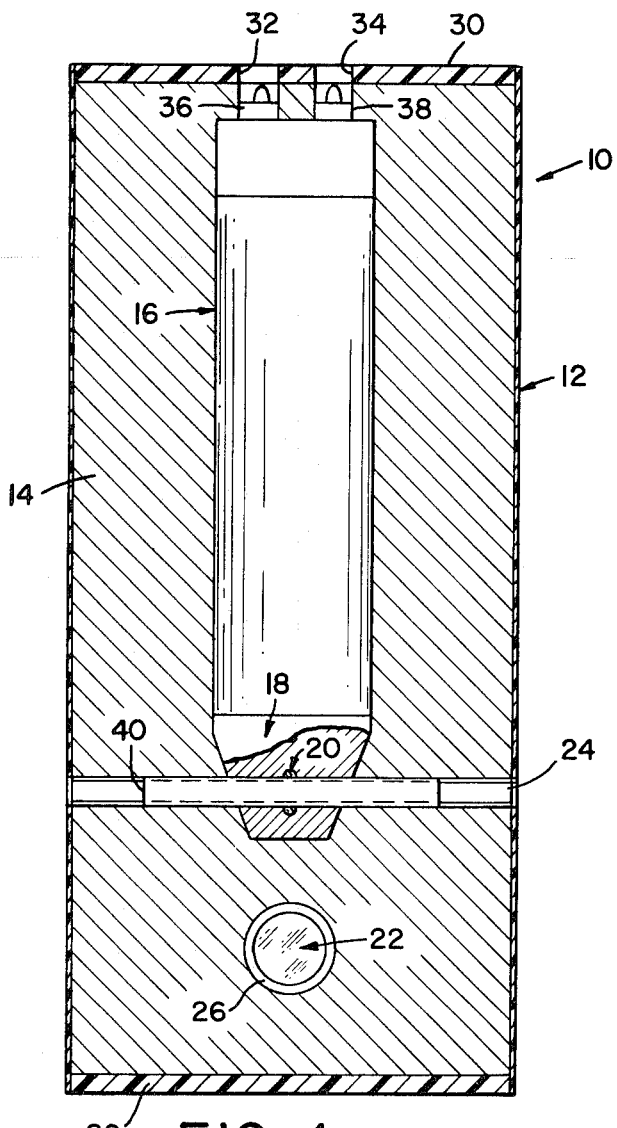
FIG_1
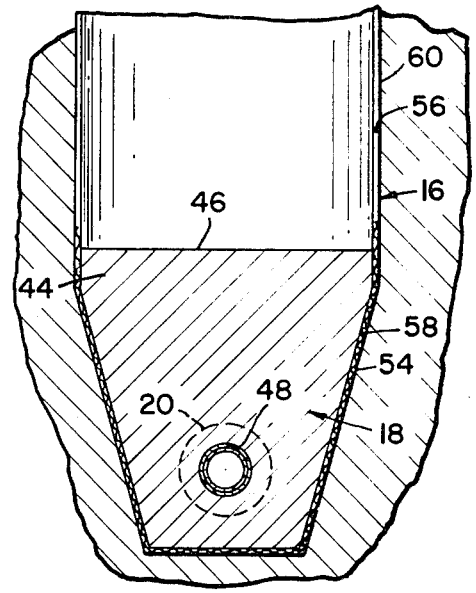
FIG_3
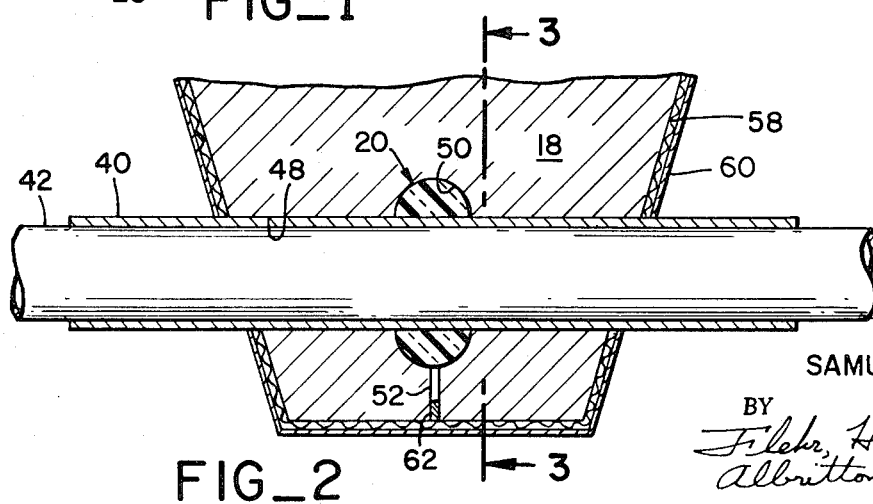
FIG_2
INVENTOR.
SAMUEL UNTERMYER
BY
Flehr, Hohbach, Test,
Albritton & Herbert
ATTORNEYS

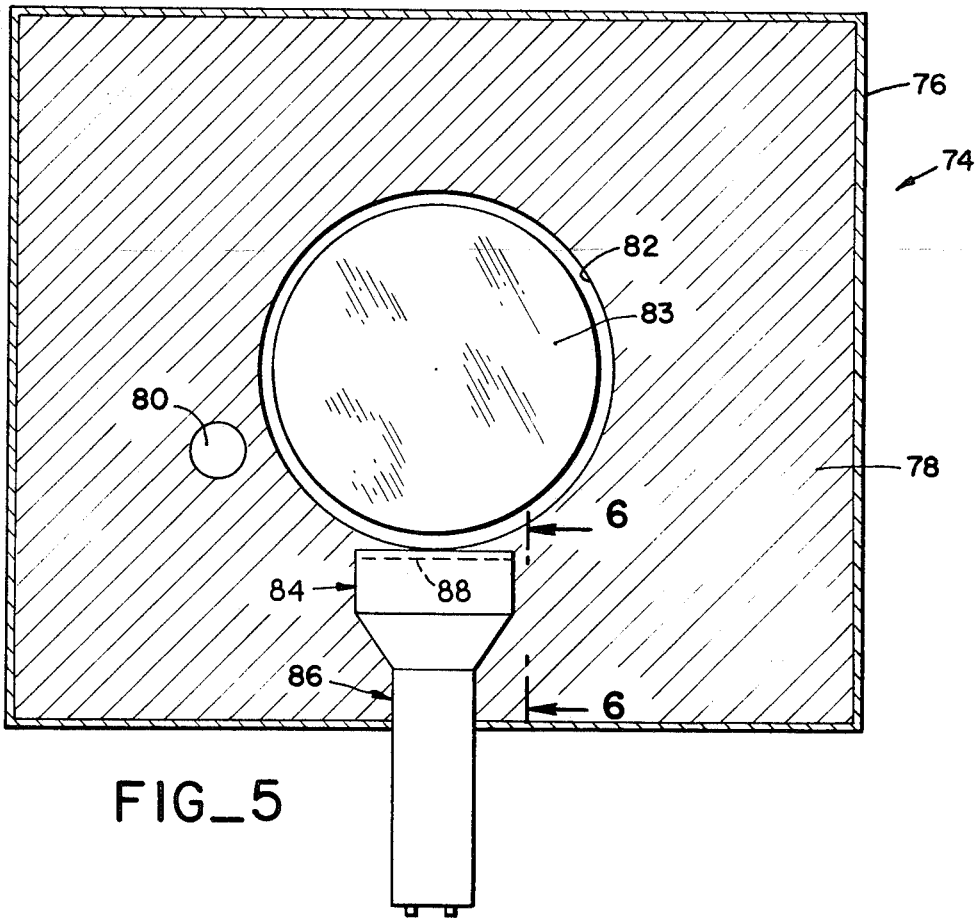
FIG_5
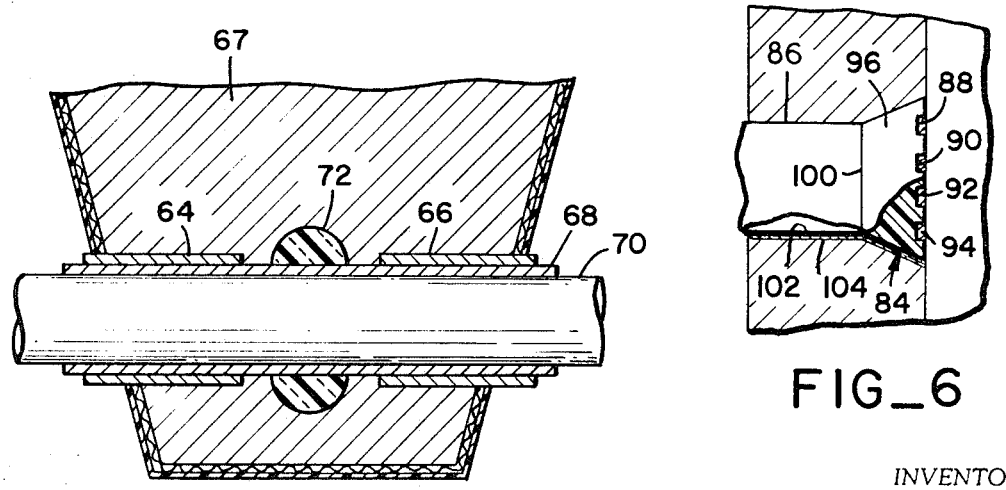
FIG_4
FIG_6
INVENTOR
SAMUEL UNTERMYER
BY
ATTORNEYS

NUCLEAR FUEL ASSAY SYSTEM

BACKGROUND OF THE INVENTION

This invention relates generally to nuclear fuel assay systems and more particularly relates to a relatively simple, inexpensive and accurate system for the non-destructive assay of fissile materials using low energy neutron sources.

The nuclear energy field has recognized the need for a simplified and easily transportable device providing an accurate, non-destructive assay of fissile material. Heretofore, the nuclear fuel assays of a manufacturer or fuel reprocessor have included chemical and isotopic assays of fuel pellets or dissolved fuel solutions. Moreover, the purchaser of the fuel, such as an electric utility, has been required to accept the A.E.C.'s or fuel supplier's assay for fresh fuel, and to accept the fuel reprocessor's assay of discharged or spent fuel elements. The value of nuclear fuel represents a large investment, for example, approximately $30 million in fabricated fuel to load a 1000–Mw power plant, but the user has been forced to accept the fuel without direct verification of its fissile content. There is no present method for conveniently and rapidly performing a non-destructive assay of completed fuel bundles which provides a positive check against inadvertent substitution of incorrect fuel pellets or rods, nor is there a convenient method of accurately assaying nuclear fuel for simplified inventory control.

SUMMARY OF THE INVENTION AND OBJECTS

It is an object of the invention to provide a nuclear fuel assay system affording simplified and rapid non-destructive assay of the fuel's fissile content with a high degree of accuracy.

Another object is to provide a small and easily transportable device for the non-destructive assay of fresh or irradiated nuclear fuels by detecting the high energy fission neutrons radiating into a scintillating material which discriminates against source neutrons.

Another object is to provide a system for assaying the fissile content of a nuclear fuel rod through a non-destructive assay of discrete segments of the rod, or individual fuel pellets, to provide a record of variation between pellets in the completed rod.

Another object is to provide a system for the non-destructive assay of the fissile content of bulk or scrap fuel.

Another object is to provide a nuclear fuel assay device incorporating a scintillating material containing both hydrogenous material and large grain phosphors effective to detect fast neutrons emitted from the fuel and to discriminate against source neutrons used as the interrogating neutron beam.

Another object is to provide a nuclear fuel assay device incorporating a neutron interrogating beam source having an energy level of less than 1 Mev, a moderating material to reduce the energy of the interrogating neutrons to a level effective to fission the fissile fuel, but not effective to cause proton recoil in an hydrogenous phosphor scintillating material adjacent the fuel to be assayed, and with photo-detecting means for counting scintillation events generated by fast neutrons radiating from the fuel.

The invention broadly provides a highly accurate system for the non-destructive assay of the fissile content of nuclear fuel. A source of interrogating beam neutrons, moderator material, scintillating material, and light detector means are arranged in a compact and easily transportable unit providing accurate and rapid assay of fuel rods in one preferred form, and bulk or scrap fuel in another form. The interrogating beam of neutrons is produced from a source providing an energy level of less than 1 Mev, and the moderating material reduces the energy levels of these neutrons to within the thermal and low epi-thermal regions. The scintillating material is juxtaposed with the fuel for receiving fast neutrons radiated from fission events produced by the moderated source neutrons. The scintillating material comprises a mixture of hydrogenous material and phosphor grains effective to discriminate between source neutrons and the fast neutrons which are to be counted. The preferred ZnS phosphor crystals are relatively large in grain size to absorb recoil protons from the hydrogenous material in individual grains, and also provide transparency for transmitting scintillation event photons. The use of large grain phosphors improves the ability of the detector to discriminate between low and high energy neutrons. The scintillation events are counted by means of a light detector receiving the photons transmitted through a light guide of non-scintillating transparent material, which may also have neutron modulating properties. For increased counting efficiency a layer of light reflecting material is positioned around the light guide and this in turn is covered by a light shield excluding external light.

In one form of the invention for the assay of fuel rods, an opening is provided through the light guide for slidably receiving a fuel rod, and the scintillating material defines an annulus embedded in the light guide and surrounding the opening for assaying a discrete segment or pellet of the rod. A method of producing this configuration includes forming the opening within the light guide, forming an annular internal groove within the opening, inserting a sleeve within the opening to define a closed cavity with the groove, injecting a mixture of white oil or white grease and ZnS grains through a fill hole into the cavity so that the mixture forms a paste of scintillating material, and plugging the fill hole.

In a modified form for assaying the fissile content of bulk and scrap fuel, the fuel sample to be assayed is placed in a cavity of a moderating material such as hydrocarbon wax. A source of neutrons is embedded in the wax for directing an interrogating neutron beam into the fuel. A series of generally parallel spaced-apart scintillating material rows are arrayed in a common plane adjacent the cavity. Fast neutrons radiating from the fuel produce proton recoil of the hydrogenous material in the scintillating rows, and the recoil protons trigger scintillation events in large grain ZnS crystals. Photons from these scintillation events travel through a light guide and into a light detector for counting.

DESCRIPTION OF THE DRAWINGS

FIG. 1 is a cross-section elevational view of a nuclear fuel assay system illustrating features of the invention;

FIG. 2 is a cross-section view to an enlarged scale of component elements of the system of FIG. 1;

FIG. 3 is a side elevational cross-section view taken along the line 3—3 of FIG. 2;

FIG. 4 is a partial cross section view of a modified form of the invention;

FIG. 5 is a top plan section view of another modified form used for bulk and scrap fuel assays; and, FIG. 6 is a side elevational section view taken along the line 6—6 of FIG. 5.

DESCRIPTION OF THE PREFERRED EMBODIMENTS

FIG. 1 illustrates generally at 10 a device for assaying the fissile content of nuclear fuel rods for use in nuclear reactors. The assay device 10 comprises an outer casing 12 enclosing a moderator material 14, light detector or counter 16, a transparent medium or light guide 18, a body of scintillating material 20, and low energy neutron source 22. The fuel rod to be assayed is slidably received through an opening 24 extending transversely through casing 12, moderator material 14, light guide 18, and scintillating material 20. A transverse opening 26 is provided through the casing and moderator material for receiving and positioning source 22 in proximity to the fuel rod so that a beam of interrogating neutrons is directed through the moderator material and into the fissile material of the fuel.

Casing 12 contains the various elements of the assay device in a small and compact unit adaptable for easy handling and transportability. The casing is shown as a section of an elongated cylinder, preferably of metal for structural strength, enclosed at one end by bottom wall 28 and at its other end by top wall 30. The top wall is provided with a pair of openings 32,34 for receiving suitable electric cables connected between light detector terminals 36,38 and a conventional electronic counting unit, not shown.

Moderator material 14 surrounds the various elements within the casing and functions to reduce the energy levels of both source and fission neutrons. The interrogating beam neutrons from source 22 are below about 1 Mev in energy, and these neutrons are moderated before reaching the fuel element to energy levels in the thermal or low epi-thermal regions. Neutrons modulated within this range penetrate the region of fuel adjacent scintillating material 20 and are effective to fission U–235 and Pu–239 elements for producing both prompt and delayed neutron emissions.

Moderator material 14 comprises any suitable neutron moderator preferably having a high scattering cross section, a low atomic weight, and a low neutron absorption cross section. A high density hydrocarbon wax is preferred in view of its adaptability for containerization in the small, easily transportable unit 10. A suitable polymer such as polyethylene may also be employed as the moderator.

Neutron source 22 provides a relatively long-life, low energy neutron source within the desired energy spectrum of below 1 Mev. Neutrons within this energy spectrum do not fission the U–238 or Th–232 isotopes of the fuel, which would otherwise mask the U–235 and Pu–239 fissions, and yet have sufficient energy to penetrate complete fuel bundles or containers of fissile materials. Preferably a source comprising finely divided alpha particle emitters intimately mixed with finely divided lithium hydride powder, e.g., a mixture of Pu-Lih, as described in applicant's co-pending application Ser. No. 854,907, filed Sept. 3, 1969, would be utilized to provide the source neutrons. This source radiates only low energy neutrons and soft Gamma rays so that special handling and shielding arrangements are not required and the radiation dose to the operator is within acceptable limits.

Opening 24 extends transversely through light guide 18, moderator 14, and casing 12 for slideably receiving the fuel rod to be assayed. A cylindrical bearing sleeve 40, preferably of aluminum material, is mounted within opening 24 for supporting and guiding exemplary fuel rod 42, as best illustrated in FIG. 2.

Light guide 18 reflects and transmits photons received from scintillation events in material 20 into the end of light detector 16. The light guide is shown in the preferred frustoconical configuration with a cylindrical base segment 44 in close-spaced facing relationship with the flat transparent end wall of light detector 16. A thin layer of silicone light coupling grease 46 is provided between the flat facing surfaces of the light detector and base 44 to eliminate internal reflection at the upper surface of the light guide. The material of light guide 18 should be a non-scintillating, transparent material, preferably a polymer relatively high in hydrogen content since the material of the light guide may also contribute neutron moderating properties. An acrylic plastic such as methyl methacrylate, sold under the trademark "Lucite" by E. I. du Pont de Nemours & Co., is preferred in that it provides all of the aforementioned properties, and furthermore, provides rigid support between the light detector and scintillating material.

The body of the light guide is formed with a transverse bore 48 receiving aluminum sleeve 40. An internal annular groove 50 is formed in the light guide and defines with the outer surface of sleeve 40 a hollow cavity for containing scintillating material 20. A passageway or fill hole 52 extends through the lower end of the light guide for filling the cavity with the scintillating material, explained hereafter.

Light guide 18 is positioned within a frusto-conical cavity 54 in the wax while light detector 16 is positioned within an upper cylindrical cavity 56. The light detector and light guide are radially spaced from their respective cavities for receiving an opaque, light reflecting layer 58, preferably aluminum foil or the like. The foil is slightly wrinkled or crumpled so that it does not lie flat against the outer surface of the light guide, thereby improving the internal reflecting properties of the polished outer surface of the light guide. The photons which pass through the light guide surface are reflected back into the light guide by the foil for transmission to the light detector. Furthermore, layer 58 functions as a primary shield excluding external light from the light guide and detector. In addition, a secondary layer of light shielding material 60, preferably black tape or the like, overlies primary layer 58 for additionally excluding external light. Aluminum sleeve 40 also functions as a barrier preventing external light from entering the light guide from within the fuel rod opening.

Scintillating material 20 comprises a mixture of an hydrogenous material and a phosphor. The hydrogenous material supplies a large number of hydrogen atoms which produce recoil protons when struck by fast neutrons radiating from the fuel. The recoil protons in turn enter the phosphor crystals producing photon scintillation events. The hydrogenous material should also be relatively transparent to effeciently transmit the photons into the surrounding light guide, and will usually provide additional moderation of the neutrons. Preferably, the hydrogenous material is heavy white mineral oil or grease, although it could also be a silicone grease.

The phosphors used in the scintillating material are preferably large grain zinc sulfide, silver-activated crystals. The ZnS crystals are selected with a mean dimension across the grain of approximately 50 microns. The crystals of this large grain size provide unexpected results over the smaller normal size ZnS crystals of approximately 5 microns. These larger grain ZnS crystals provide a much greater degree of energy discrimination between high and low energy neutrons when used as a recoil proton counter. That is, substantially all of the energy of the recoil proton is given up in a single, large grain of ZnS for producing the scintillation event. If the recoil proton goes through an entire grain in this way, then the resulting flash or scintillation is more proportional to the proton's energy. Furthermore, the large grain crystals have fewer refracting surfaces and these do not scatter the photons to the degree that the smaller grains would so that they are more efficient in transmitting the photons.

The body of scintillating material 22 is formed by first mixing approximately equal parts of the ZnS crystals and heavy white oil or grease together to form a paste. This paste is injected under pressure through fill hole 52 into the cavity formed between groove 50 and sleeve 40 so that it forms an annulus around sleeve 40. A plug 62 is then provided in the fill hole to seal the paste within the cavity. The resulting paste remains relatively stable in the cavity.

Light detector 16 preferably comprises a conventional photomultiplier tube having its lower, transparent end abutting against silicone grease layer 46 and light guide base 44. Photons generated from the scintillating material and transmitted through the light guide enter the photomultiplier tube striking its photocathode for amplification. The signals produced in the photomultiplier tube are analyzed by the electronic unit connected with terminals 36,38 for counting and recordation of events above a fixed photon recoil energy discrimination setting.

In the operation of assay device 10 a fuel rod 42 is positioned within opening 24 until the fuel segment to be assayed is in registry with scintillating material annulus 20. The neutrons radiating from neutron source 22 in the direction of the fuel are moderated down to the thermal or low epi-thermal regions by both wax moderator material 14 and the polymer material of light guide 18. This interrogating beam of neutrons fissions the fissile material of the fuel, except for the U-238 isotopes, and the fissional fuel in turn radiates fast neutrons outwardly. The fast neutrons entering the scintillating material 20 strike the hydrogen atoms of the hydrogenous material causing proton recoil. The recoil protons in turn strike the large grain ZnS crystals causing scintillation events which transmit photons through the phosphor crystals and hydrogenous material outwardly into the light guide 18 and light detector 16. Photons radiating away from the light detector are reflected back both internally from the polished surfaces of the light guide, and by the aluminum foil reflector 56. Photons reaching the light detector generate signals for counting of the scintillation events and recordation of the fissile content of the fuel.

Referring to FIG. 4, a modified form of the invention is illustrated for use in applications where it is desired to limit the source neutron flux to a more restricted region of the fuel. In this modification a pair of spaced, cylindrical shields 64,66 of cadmium or boron material are mounted within a light guide 67 of a nuclear assay device similar to that described in FIG. 1. Thus, the shields are positioned over an aluminum sleeve 68 slideably receiving a fuel rod 70. An annulus 72 of a scintillating material comprising a mixture or paste of hydrogenous material and ZnS large grain phosphor crystals is positioned around sleeve 68 intermediate the shields. The neutron source, not shown, preferably the previously described Pu-LiH source, provides an interrogating beam of neutrons which is brought down to the thermal or low epi-thermal regions by the moderating material, not shown. The flux of these source neutrons is limited to a predetermined region of the fuel rod, for example a single fuel pellet, by means of shields 64,66 which absorb neutrons outside of the desired region. The fissile material fissioned by the interrogating neutrons radiates fast neutrons into annulus 72 of the scintillating material producing proton recoil in the hydrogenous material, scintillation events in the ZnS crystals, photon radiation through the light guide 67, and counting and recordation by the light detector or photomultiplier tube and associated electronic circuitry.

Referring to FIGS. 5 and 6 a bulk and scrap fuel assay device 74 is illustrated. Assay device 74 includes an outer shell or casing 76 enclosing moderator material 78, preferably a wax, a neutron source 80 embedded within the moderator material, a cavity 82 for receiving a fuel sample 83 to be assayed, combined scintillating material and light guide unit 84, and light detector 86. A suitable cover, not shown, containing a moderating material may be employed to seal cavity 82 after the fuel element is in place.

Neutron source 80 provides a source of neutrons below 1 Mev which do not fission the U-238 or Th-232 isotopes but yet have sufficient energy to penetrate containers of fissile materials placed within the cavity for fission of U-235 and Pu-239 elements. Fissile materials which may be assayed with device 74 can be in pellet, powder or solution forms and in any type of container such as cans or bottles and the like which are capable of being received within the cavity.

The combination scintillating material and light guide unit 84 is illustrated in detail in FIG. 6 and comprises a series of rows 88–94 of scintillating material deposited within spaced parallel grooves formed on the flat surface or base of a truncated prism of transparent, non-scintillating material 96, preferably a methyl methacrylate polymer, defining the light guide. The upper flat surface of prism 96 faces the transparent end of a conventional light detector or photomultiplier tube 86. The interface 100 between the light guide and light detector is filled with a silicone light coupling grease to eliminate or reduce internal light reflection. A layer 102 of a suitable light reflecting material, preferably crumpled aluminum foil, covers the outer surfaces of the light guide and photomultiplier tube to both reflect light back into the light guide and also serve as a primary shield excluding external light. A secondary light shield layer 104, preferably black tape, overlies the primary layer 102 to further exclude external light.

The scintillating material of the rows 88–94 comprises a mixture or paste of hydrogenous material and large grain phosphor crystals. The hydrogenous material can be a heavy white oil or mineral oil, although a clear silicone grease could be used. Preferably the phosphor comprises ZnS crystals having a mean grain size on the order of 50 microns.

Source 80 and light guide unit 84 are spaced circumferentially around cavity 82 along radii having an included angle on the order of 70° so that a substantial shield of moderating material exists between the source and scintillating material.

In the operation of the assay device 74 a beam of interrogating neutrons radiating from source 80 toward the fuel within sample cavity 82 is moderated by wax material 78 to the thermal or low epi-thermal regions. Neutrons entering the fuel fission the fissile material producing fast neutrons radiating into the scintillation rows of unit 84. Neutrons passing through the hydrogenous material in these rows strike the hydrogen atoms and produce recoil protons which travel into the large grain ZnS phosphor crystals producing scintillation events. Photons transmitted through the relatively transparent phosphor grains and hydrogenous material enter light guide 96 and are transmitted or reflected into photomultiplier tube 98. The counting of the scintillation events by the photomultiplier tube is recorded by the associated electronic circuitry to provide the assay of the fissile content of the bulk and scrap fuel.

While the embodiments herein are considered to be preferred, it is understood tha various changes in the details, material, and arrangements of elements, which have been described and illustrated in order to explain the nature of the invention, may be made by those skilled in the art within the principle and scope of the invention as expressed in the appended claims.

I claim:

1. A system for assaying the fissile content in nuclear fuel material, the system comprising the combination of: a body of scintillating material positioned to receive fast neutrons radiating from fission events in the fuel material, the scintillating material comprising an hydrogenous material generating recoil protons when struck by the fast neutrons, and phosphor material generating photons when struck by the recoil protons; a source of neutrons having an energy level below approximately 1 MEV and adapted to direct an interrogating beam of said neutrons to the fuel material; moderating means to reduce the energy level of the source neutrons directed toward the fuel to substantially within the thermal or lower epi-thermal regions; light detector means to detect photons for providing a measurement of said fissile content; and, light guide means to transmit the photons emitted from the scintillating material to the light detector means, said body of scintillating material being juxtaposed with respect to the nuclear fuel material but spaced a relatively large distance from said source of neutrons and separated therefrom by moderating material whereby said scintillating material is relatively insensitive to said source of neutrons.

2. The invention of claim 1 and further characterized in that the system is adapted to assay an elongated fuel rod containing the nuclear material, the body of scintillating material defines an annulus through which the fuel rod is positioned for assaying a defined segment of the rod in registry with the annulus, and the light guide means comprises a body of non-scintillating, substantially transparent material enclosing the annulus and defined segment of the fuel rod to reflect and transmit said photons to the light detector means.

3. The invention of claim 2 and further characterized in that the light guide means includes an opaque sleeve coaxially positioned within the annulus and extending through the transparent material to slideably receive the fuel rod, the sleeve shielding the light guide means from external light entering from within the sleeve.

4. The invention of claim 2 and further characterized in that the light guide means includes reflector means enclosing the transparent material around at least the region surrounding the scintillating material annulus to reflect photons back into the transparent material.

5. The invention of claim 4 and further characterized in that the moderating means defines a cavity with the light guide means positioned in the cavity spaced from the cavity walls; and, the light reflector means comprises a light reflective layer in the space between the cavity wall and light guide means.

6. The invention of claim 4 and further including light shield means surrounding the light guide means to exclude external light from the light guide means and light detector means.

7. The invention of claim 1 and further characterized in that the phosphor comprises zinc sulfide.

8. The invention of claim 1 and further characterized in that the moderating means encloses the source of neutrons, light detector means, and body of scintillating material, and an opening is provided through the moderating means for positioning the fuel material in the interrogating beam of source neutrons, 9. The invention of claim 8 and further characterized in that the system includes a casing enclosing the neutron source, light detector means, and light guide means, and the moderating means fills the voids between the casing and neutron source, light detector means, and light guide means.

10. The invention of claim 1 and further characterized in that the light guide means comprises a non-scintillating, substantially transparent, substantially non-hydrogenous polymer.

11. The invention of claim 10 wherein the outer surface of the polymer material is polished to provide internal surface reflections of the photons received from the scintillating material.

12. The invention of claim 10 and further characterized in that the polymer comprises methyl methacrylate.

13. The invention of claim 1 and further characterized in that the body of scintillating material defines an annulus through which a rod of the nuclear material is positioned for assaying a defined segment of the rod in registry with the annulus, the light guide means comprises a non-scintillating, substantially transparent material enclosing the scintillating material annulus on the periphery of the fuel rod for transmitting photons received from the scintillating material to the light detector means, and including a neutron-absorbing sleeve positioned between the fuel rod and light guide means, the sleeve defining an annular slot in registry with the defined segment of the fuel rod for controlling the neutron flux of the source neutrons entering the rod.

14. The invention of claim 1 and further characterized in that the moderating means defines a central cavity for receiving bulk or scrap nuclear fuel; the source of neutrons is positioned in the moderating means along a first radius from the cavity; the body of scintillating material is positioned in the moderating means along a second radius from the cavity for receiving fast neutrons radiating from fission events generated by irradiation of the fuel by moderated source neutrons; the light guide means is juxtaposed with the body of scintillating material for receiving photons emitted therefrom; and, the light detector means is juxtaposed with the light guide means for producing counting signals responsive to the photons transmitted through the light guide means.

15. The invention of claim 14 and further characterized in that the body of scintillating material defines a plurality of spaced-apart, elongated rows arrayed in a plane facing the cavity, and the light guide means comprises a non-scintillating, transparent material extending between the scintillating material rows and the light detector means.

16. The invention of claim 14 and further characterized in that the neutron source and body of scintillating material are circumferentially spaced around the cavity to interpose a substantial shield of moderating means therebetween.

17. A system for assaying the fissile content in nuclear fuel material, the system comprising the combination of: a body of scintillating material positioned to receive fast neutrons radiating from fission events in the fuel material, the scintillating material comprising a mixture of an hydrogenous material generating recoil protons when struck by the fast neutrons, and phosphor material generating photons when struck by the recoil protons, said phosphor material having grains substantially larger than 5 microns whereby substantially all of the energy of a recoil proton is given up in a single phosphor grain; a source of neutrons having an energy level below approximately 1 MEV and adapted to direct an interrogating beam of said neutrons to the fuel material; moderating means to reduce the energy level of the source neutrons directed toward the fuel to substantially within the thermal or lower epithermal regions; light detector means to detect photons for providing a measurement of said fissile content; and, light guide means to transmit the photons emitted from the scintillating material to the light detector means.

* * * * *